April 24, 1928.

E. J. McCARTY

AUTOMOBILE JACK

Filed Dec. 10, 1926

Inventor
Eugene J. McCarty
By Attorneys
Southgate Fay & Hanley.

April 24, 1928.   1,666,971
E. J. McCARTY
AUTOMOBILE JACK
Filed Dec. 10, 1926    2 Sheets-Sheet 2
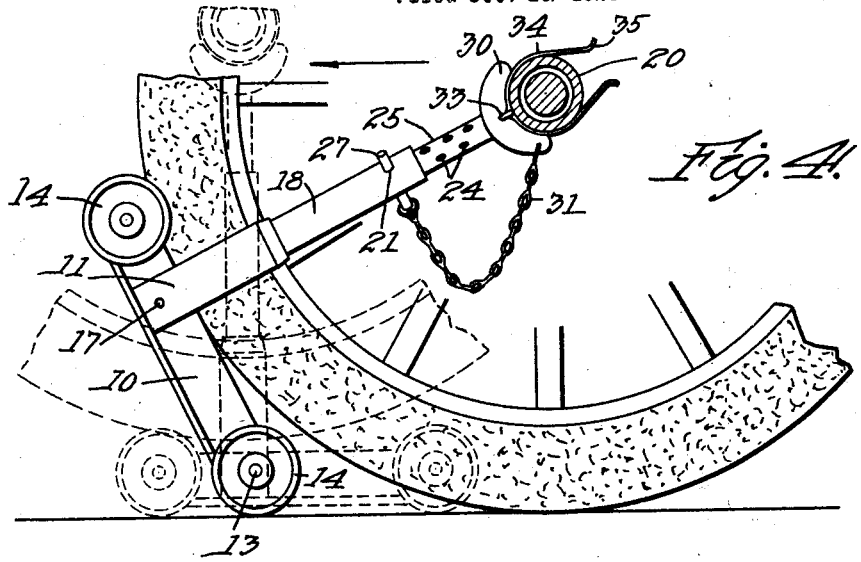
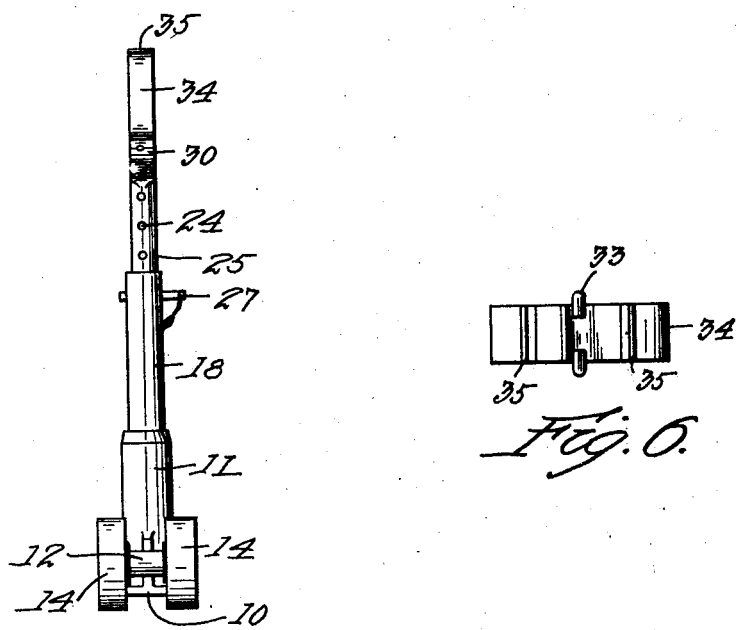
Inventor
Eugene J. McCarty
By Attorneys Patented Apr. 24, 1928.

1,666,971

UNITED STATES PATENT OFFICE.

EUGENE J. McCARTY, OF CLINTON, MASSACHUSETTS.

AUTOMOBILE JACK.

Application filed December 10, 1926. Serial No. 153,967.

This invention relates to a jack having the same general objects as my prior invention patented April 13, 1926, No. 1,580,209, but also having for its objects the simplification of the device, the reduction in cost of manufacture, and especially the arrangement of the jack in such a manner that it does not have to have any special connection on or near the axle for the jack to be connected with. On the other hand, the jack is provided with means whereby it can be connected with the axle, in fact any axle, so that it will operate in substantially the same manner as the jack represented in my above mentioned patent.

Other objects and advantages of the invention will appear hereinafter.

Reference is to be had to the accompanying drawings in which:

Fig. 4 is a similar view of the front wheel showing the first stage in lifting the jack;

Fig. 5 is an edge view of the jack; and

Fig. 6 is an enlarged plan view of the device for connecting the jack with the axle.

Figure 1:
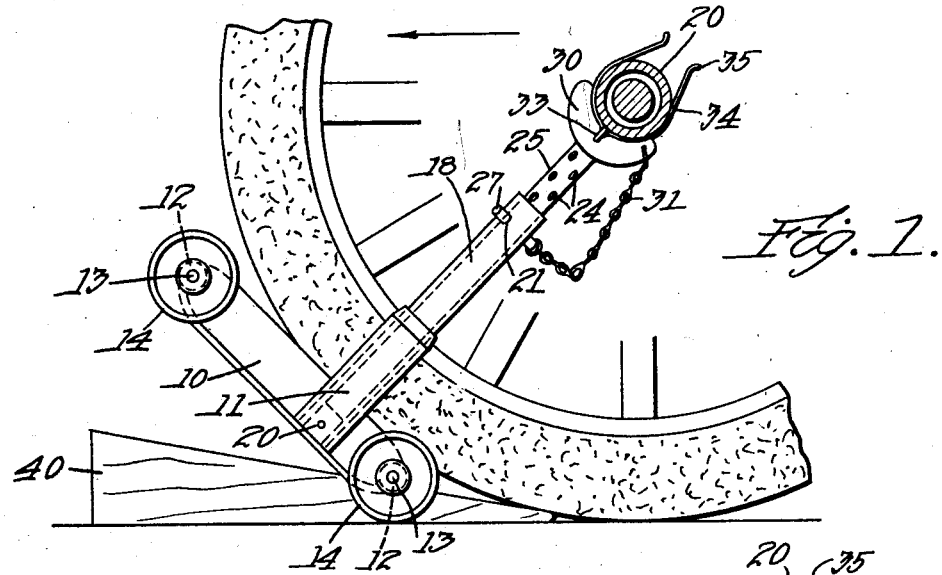
Fig. 1 is a side view of the rear wheel of an automobile with this jack applied thereto and shown in the position it assumes when starting to raise the wheel by backing the car.

This jack, as is the case with the one described in my above mentioned patent, is without any rack or lifting screw or any system of levers for raising the jack, in fact it may be described as relating to that type of jacks in which the lifting is done without in any way changing the distance between the bottom of the jack and the axle and also lowered without any such change. Although this is the case, the device is adjustable in height. This adjustability, however, is for the use of the jack on different cars.

The jack comprises a base 10 having near one end a vertical cylindrical socket 11 projecting upwardly therefrom and integrally connected wtih the base. This socket is open at the top. At the ends of the base are two hubs 12 each with a shaft or axle 13 therethrough and four wheels or rollers 14 on the axle 13. The wheels 14 support the axle and the axle supports the hubs. These parts are very simply made of malleable cast iron without any boring, drilling or finishing except for the securing of the ends of the axle so that the wheels will not come off.

Standing upright in the socket 11 is a tube 18 which is provided with opposite perforations adapted to register with perforations 20 in the bottom of the socket. A pin 17 can be put through to hold this tube against being lifted and preventing the base dropping off the tube. This tube is open at the top and provided with a pair of opposite perforations 21.

Setting down into the tube 18 is a smaller tube 25. This is provided with a series of cross perforations 24 extending through it adapted to register with the upper perforations in the tube 18 and to be held in any adjusted position therein by a pin 27 which is adapted to be projected through the perforations in the two tubes. These perforations in the tube 25 are staggered and closely arranged so that fine adjustment can be secured. It is to be understood that these adjustments are made for the purpose of adapting the jack to cars having axles of different kinds and heights and that the adjustment is not changed while the load is being raised or lowered.

At the top of the tube 25 is a head 30 of malleable cast iron or the like. This is provided with an opening through which a chain 31 is connected and this chain is connected with the pin 27 so as to avoid the loss thereof. On the head is a wire connection 33 bent over at the top to hold the bottom of a spring support 34. This spring support extends upwardly in both directions and is bowed outwardly and then inwardly and then provided with outward diverging projections 35 at the top. It is held to the head by the wire and is designed to receive and grasp the axle of the car and hold the jack thereon without yielding enough to drop the jack. Of course the head 30 is provided with a seat to fit the bottom of the spring jaws just described and give them a firm place to rest so that they will not be in danger of being broken by the load which rests upon them. This is all supported by the head itself.

Figure 2:
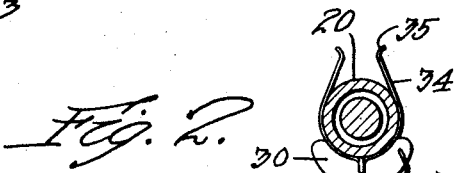
Fig. 2 is a similar view showing the position of the parts when in their highest position.

In the operation of the jack for lifting the rear wheel the jack is forced on the axle by pushing it so that the jaws will yield and envelop the axle 20 so as to hold the jack thereon. It is swung around downwardly to an inclined position shown in Fig. 1 with one pair of rollers resting on the ground. A wedge 40 is placed under the wheel. Now as the wheel and car move in the direction of the arrows, the tire will go up the incline of the wedge and the wheels at one end of the base will roll along the ground without resistance, the other pair of wheels being held up out of the way. After the wheel has climbed up the wedge far enough so that the jack swings to the vertical position shown in Fig. 2, the wheel will be off the ground and the jack will simply hang on the axle by the spring jaw arrangement.

Figure 3:
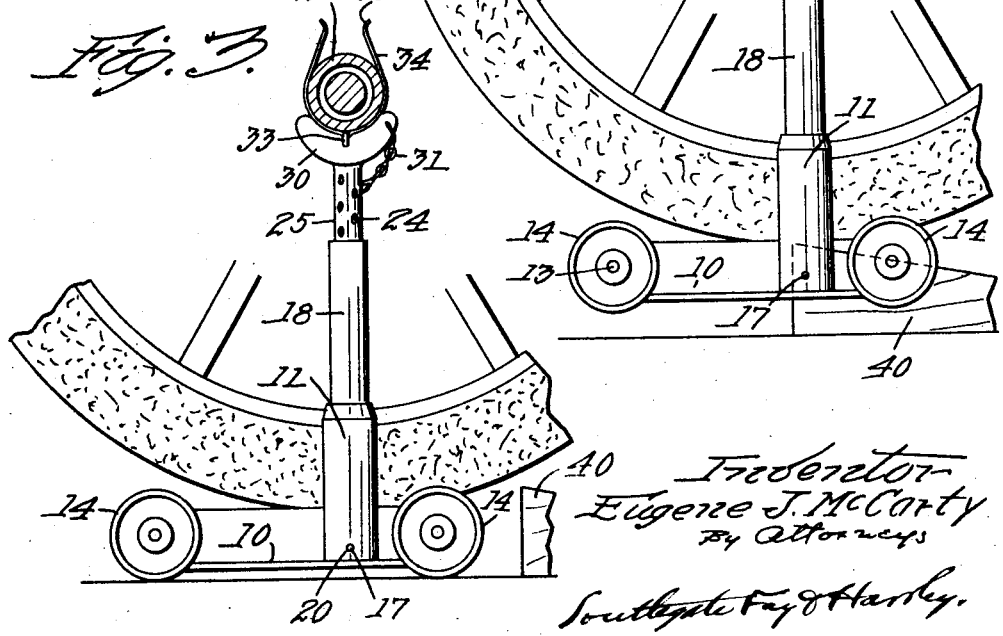
Fig. 3 is a similar view showing the final position with the axle resting on the jack.

The wheel is moved along the wedge farther until the tire rolls off the high end of the wedge and that will leave the car and jack in the position shown in Fig. 3. The tire is removed, or any repairs made that may be desired, and the jack can be released by turning the wedge around end for end and moving the car in the opposite direction to lift the wheel again. This causes the jack first to be lifted from the ground and to depend from the axle in the same way as before. Then when the wheel drops off the wedge, the small wheels will support the forward end of the base of the jack and hold it back so that it will come to the inclined position indicated in Fig. 1. It can be removed simply by pulling it way from the axle.

It is to be observed that the socket on the base of the jack is located over at one end of the base. It has rollers near the socket that perform the above mentioned actions, the other rollers being idle.

In using this jack for the front wheel, the two small rollers on the short end of the base are not used but only the two on the other end. Here the jack is connected with the axle in the manner above indicated and the car moves forward as shown in Fig. 4. The effect of this is merely to tip the jack over the rollers on the long end of the base as shown in Fig. 4 until the jack comes to an upright position, resting on this point when the jack supports the axle. To release it the car is simply backed so as to swing the jack over to the position shown in Fig. 4. The wedge is not needed in lifting the front end of the car but may be used.

By the present construction, the jack is capable of being made of malleable iron castings and pieces of tubing of very inexpensive character. Very little machining of any kind whatever is needed and that practically all drilling. In this way a very inexpensive jack is provided and furthermore it is of the strongest possible character and has no tight fitting parts and nothing that is likely to get out of order even when subject to the rough usage that is almost universal.

Although I have illustrated and described only one form of the invention I am aware of the fact that modifications can be made therein by any person skilled in the art without departing from the scope of the invention as expressed in the claim. Therefore, I do not wish to be limited to all the details of construction herein shown and described, but What I do claim is:—

In an automobile jack, the combination with a base having a socket projecting upwardly therefrom near one end, a telescoping support carried in said socket and connected with the base to hold the upper end of the telescoping support always at the same distance from the base, a head on the upper end of said support adapted to support the axle of a car and having a seat therethrough at the top, and means on said head for grasping the axle of an automobile simply by pressing the jack upwardly toward it so that the jack will be supported by and hung from the axle and will be capable of swinging about it.

In testimony whereof I have hereunto affixed my signature.

EUGENE J. McCARTY.